US008036231B2

(12) United States Patent
Pratt

(10) Patent No.: US 8,036,231 B2
(45) Date of Patent: Oct. 11, 2011

(54) WALL-MOUNTABLE CONNECTOR

(75) Inventor: Michael K. Pratt, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1253 days.

(21) Appl. No.: 11/199,813

(22) Filed: Aug. 9, 2005

(65) Prior Publication Data

US 2007/0058666 A1 Mar. 15, 2007

(51) Int. Cl.
 *H04L 12/28* (2006.01)
(52) U.S. Cl. ......... 370/401; 370/235; 370/419; 709/250
(58) Field of Classification Search ................ 439/676, 439/536, 49, 660; 370/236.2, 401, 465–466, 370/235, 419; 709/217, 223, 230, 236, 238, 709/250; 398/115–117, 135, 138, 139, 140, 398/164
See application file for complete search history.

(56) References Cited

U.S. PATENT DOCUMENTS

| 6,154,774 | A  | * | 11/2000 | Furlong et al. ............... 709/224 |
| 6,364,535 | B1 |   | 4/2002  | Coffey |
| 6,556,097 | B2 |   | 4/2003  | Coffey |
| 6,637,949 | B2 |   | 10/2003 | Loch et al. |
| 6,684,347 | B1 |   | 1/2004  | Coffey |
| 6,854,895 | B2 |   | 2/2005  | Coffey et al. |
| 6,912,349 | B2 |   | 6/2005  | Clark et al. |
| 6,955,477 | B1 |   | 10/2005 | Coffey |
| 7,054,163 | B2 |   | 5/2006  | Coffey |
| 7,237,041 | B2 |   | 6/2007  | Hatte |
| 7,316,586 | B2 |   | 1/2008  | Anderson et al. |
| 2003/0021281 | A1 | * | 1/2003  | Tanaka et al. ............... 370/401 |
| 2004/0013369 | A1 | * | 1/2004  | Coffey et al. ............... 385/53 |
| 2004/0247313 | A1 |   | 12/2004 | Tanaka |
| 2005/0076129 | A1 |   | 4/2005  | Coffey |
| 2005/0152306 | A1 | * | 7/2005  | Bonnassieux et al. ........ 370/328 |
| 2005/0191056 | A1 |   | 9/2005  | Coffey |
| 2006/0186739 | A1 | * | 8/2006  | Grolnic et al. ............... 307/64 |
| 2006/0217847 | A1 |   | 9/2006  | Anderson |

FOREIGN PATENT DOCUMENTS

| EP | 0963081  | 12/1999 |
| WO | 00064099 | 10/2000 |

OTHER PUBLICATIONS

ADC, "ADC OptEnet Media Converter Communications User Manual", Apr. 2003, pp. 1-6-3, Publisher: ADC Telecommunications Inc., Published in: Minneapolis, MN.
"10/100 Base-SX Wall-Mount Media Converter Installation Guide", Jan. 2002, pp. 1-9, Publisher: ADC Telecommunications.

* cited by examiner

*Primary Examiner* — Aung S Moe
*Assistant Examiner* — Curtis A Alia
(74) *Attorney, Agent, or Firm* — Fogg & Powers LLC

(57) ABSTRACT

In one embodiment, a media converter comprises a power interface that extracts power from a communication medium coupled to the media converter for powering the media converter. In another embodiment, a connector comprises a first media attachment interface to physically attach a first communication medium to the connector and a second media attachment interface to physically attach a second communication medium to the connector. The connector further comprises a mounting interface to physically attach the connector to a structure. The connector communicatively couples the first communication medium and the second communication medium. The connector processes management data communicated over at least one of the first communication medium and the second communication medium.

29 Claims, 9 Drawing Sheets

WALL-MOUNTABLE CONNECTOR

TECHNICAL FIELD

The following description relates to telecommunications in general and to connectors and media converters in particular.

BACKGROUND

One way in which a first network element is communicatively coupled to a second network element is by using a connector that is mounted to a wall or other structure. For example, in one configuration, a wall-mounted connector comprises a face plate that is used to attach the connector to a wall. In such an exemplary configuration, the connector further comprises a Registered Jack-45 (RJ-45) modular jack that is accessible through an opening formed in the face plate. The RJ-45 jack terminates one end of a copper twisted-pair cable (for example, a Category 5 (CAT 5) cable). The other end of the copper twisted-pair cable is coupled to a first network element such as a hub or router. In such an exemplary configuration, a second network element (for example, a personal computer) is coupled to the RJ-45 jack using a second copper twisted-pair cable. The second copper twisted-pair cable is terminated at each end with a respective RJ-45 plug. The RJ-45 plug at one end of the second copper twisted-pair cable is inserted into an RJ-45 jack included in the second network element and the RJ-45 plug at the other end of the second copper twisted-pair cable is inserted into the RJ-45 jack included in the wall-mounted connector. In this way, the first network element is communicatively coupled to the second network element.

In the exemplary configuration described above, the wall-mounted connector is used to couple two communication links that are implemented using the same type of communication media (that is, two copper twisted-pair cables). In other configurations, a wall-mounted connector is used to communicatively couple two communication links that are implemented using different physical communication media. For example, in one such other configuration, a wall-mounted connector is used to communicatively couple an optical fiber and a copper twisted-pair cable. Such a connector converts signals received from the optical fiber to output signals suitable for transmission on the copper twisted-pair cable and converts signals received from the copper twisted-pair cable to output signals suitable for transmission on the optical fiber. Such a connector is also referred to here as a "media converter." Because a media converter typically includes active components (for example, components that perform the signal conversion), an external power adapter is typically coupled to the media converter in order to provide power to the active components of the media converter. As a result, a media converter typically must be located near a power source for power to be supplied to the media converter. This constrains where such a wall-mounted media converter can be located.

Operation, administration, and management (OAM) (or other management or diagnostic) functionality is often used in networks that contain wall-mounted connectors. However, wall-mounted connectors are typically transparent to such functionality. That is, OAM commands typically cannot be addressed to or otherwise used to interact with such a connector. This limits the resolution of such OAM functionality. For example, such OAM functionality is typically unable to determine whether a fault exists at a first network element, in a first communication link used to couple the first network element to a wall-mounted connector, in the connector itself, or in a second communication link used to couple the wall-mounted connector to a second network element.

SUMMARY

In one embodiment, a media converter comprises a first media attachment interface to physically attach a first communication medium to the media converter and a second media attachment interface to physically attach a second communication medium to the media converter. The media converter further comprises a media conversion module, communicatively coupled to the first media attachment interface and to the second media attachment interface, that converts first signals received from the first communication medium via the first media attachment interface for transmission on the second communication medium via the second media attachment interface and that converts second signals received from the second communication medium via the second physical media attachment interface for transmission on the first communication medium via the first media attachment interface. The media converter further comprises a power interface, coupled to the first media attachment interface, that extracts power from the first communication medium and supplies power to the media conversion module.

In another embodiment, a connector comprises a first media attachment interface to physically attach a first communication medium to the connector and a second media attachment interface to physically attach a second communication medium to the connector. The connector further comprises a mounting interface to physically attach the connector to a structure. The connector communicatively couples the first communication medium and the second communication medium. The connector processes management data communicated over at least one of the first communication medium and the second communication medium.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
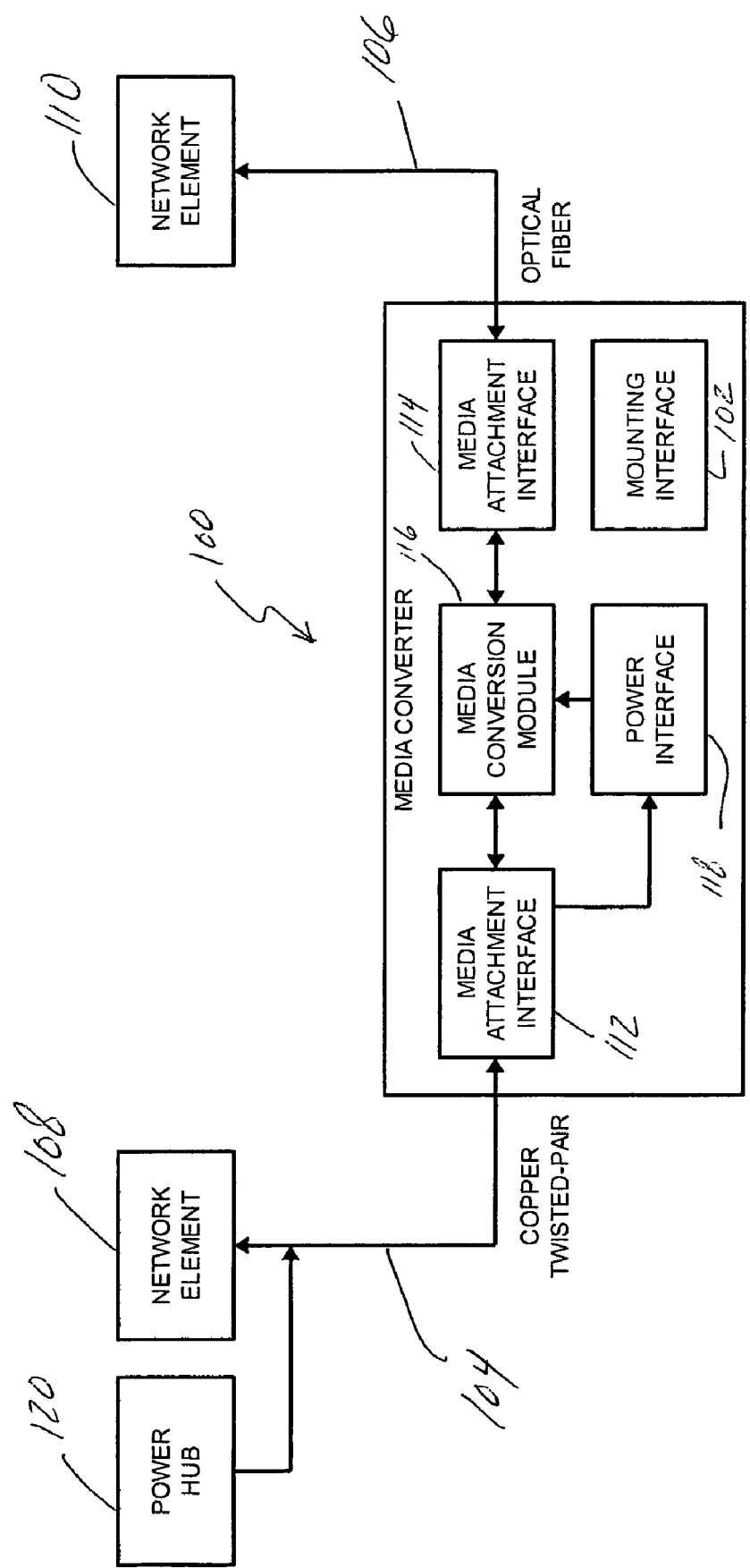
FIG. 1 is a block diagram of an embodiment of a media converter.

FIG. 1 is a block diagram of an embodiment of a media converter 100. In the embodiment shown in FIG. 1, the media converter 100 comprises a mounting interface 102 for mounting the media converter 100 to a wall or other structure. For example, in one implementation of such an embodiment, the mounting interface 102 comprises a face plate that attaches the other components of the media converter 100 (or housing that contains such components) to a wall or other structure. In another implementation, the mounting interface 102 comprises a surface-mount wall box that houses the components of the media converter 100 and attaches the components to a wall or other structure.

The media converter 100 is used to communicatively couple a first communication link 104 to a second communication link 106. The physical communication medium or media used to implement the first communication link 104 differs from the physical communication medium or media used to implement the second communication link 106. For the sake of brevity, the singular form "physical communication medium" is sometimes used herein; however, the phrase "physical communication medium" should be understood to mean "physical communication medium or media" when used hereinafter. The physical communication medium used to implement the first communication link 104 is also referred to here as the "first physical communication medium" and the physical communication medium used to implement the second communication link 106 is also referred to here as the "second physical communication medium." In the embodiment shown in FIG. 1, the first communication link 104 is implemented using a copper twisted-pair cable (for example, a CAT 5 cable) and the second communication link 106 is implemented using an optical fiber (for example, a single-mode or dual-mode optical fiber). In other embodiments, other physical communication media are used to implement the first communication link 104 and/or the second communication link 106.

The first communication link 104 is used to communicatively couple the media converter 100 to a first network element 108 and the second communication link 106 is used to communicatively couple the media converter 100 to a second network element 110. For example, in one embodiment, the first network element 108 comprises a networking device such as a hub or router and the second network element 110 comprises a computing device such as a personal computer or server computer. In other embodiments, the first network element 108 and/or the second network element 110 comprise other devices.

The media converter comprises first and second media attachment interfaces 112 and 114. The first media attachment interface 112 is used to physically attach the first physical communication medium to the media converter 100. The second media attachment interface 114 is used to physically attach the second physical communication medium to the media converter 100. In the embodiment shown in FIG. 1, where the first communication link 104 is implemented using a copper twisted-pair cable, the first media attachment interface 112 comprises a modular jack (such as modular RJ-45 jack). In such an embodiment, a plug is attached at an end of the copper twisted-pair cable used to implement the first communication link 104. The copper twisted-pair cable is physically attached to the media converter 100 by inserting the plug into the modular jack. Also, in the embodiment shown in FIG. 1, where the second communication link 106 is implemented using an optical fiber, the second media attachment interface 114 comprises a fiber connector (such as a SC, ST, or FC fiber connector). In such an embodiment, the optical fiber used to implement the second communication link 106 is physically attached to the media converter 100 by inserting the optical fiber into the fiber connector.

The media converter 100 further comprises a media conversion module 116 that converts signals received from the first communication link 104 to output signals suitable for transmission on the second physical communication medium and converts signals received from the second communication link 104 to output signals suitable for transmission on the first physical communication medium. For example, in the embodiment shown in FIG. 1, the media conversion module 116 converts 10 megabit per second (Mbps) ETHERNET traffic from 10BASE-T signals received on the copper twisted-pair cable used to implement the first communication link 104 to 10BASE-FL signals suitable for transmission on the optical fiber used to implement the second communication link 106. The media conversion module 116, in such an embodiment, also converts 10 Mbps ETHERNET traffic from 10BASE-FL signals received on the optical fiber used to implement the second communication link 106 to 10BASE-T signals suitable for transmission on the copper twisted-pair cable used to implement the first communication link 104.

The media converter 100 further comprises a power interface 118. The power interface 118 provides power to the various active components of the media converter 100. The media converter 100 is powered using power delivered on the physical communication media used to implement one of the communication links 104 or 106. In the embodiment shown in FIG. 1, power is supplied to the media converter 100 over the twisted-pair copper wiring used to implement the first communication link 104 using "Power over Ethernet" techniques specified in the Institute of Electrical and Electronics Engineers (IEEE) 802.3af standard, which is hereby incorporated herein by reference. In such an embodiment, a power hub 120 or other power supplying device (located near or incorporated in the first network element 108) injects a direct current (DC) voltage onto one or more of the wires (also referred to here as the "power wires") included in the copper twisted-pair cable used to implement the first communication link 104. The power interface 118 of the media converter 100 picks the injected DC voltage off of the power wires and uses the picked-off voltage to power the media conversion module 116. In one implementation, the power interface 118 regulates or otherwise converts the picked-off voltage to one or more voltages suitable for use by the media conversion module 116. By using power that is supplied over the first physical communication medium, the media converter 100 need not be located near an external power source. In other embodiments, power supplied over the first physical communication is used to power other components.

Figure 2:
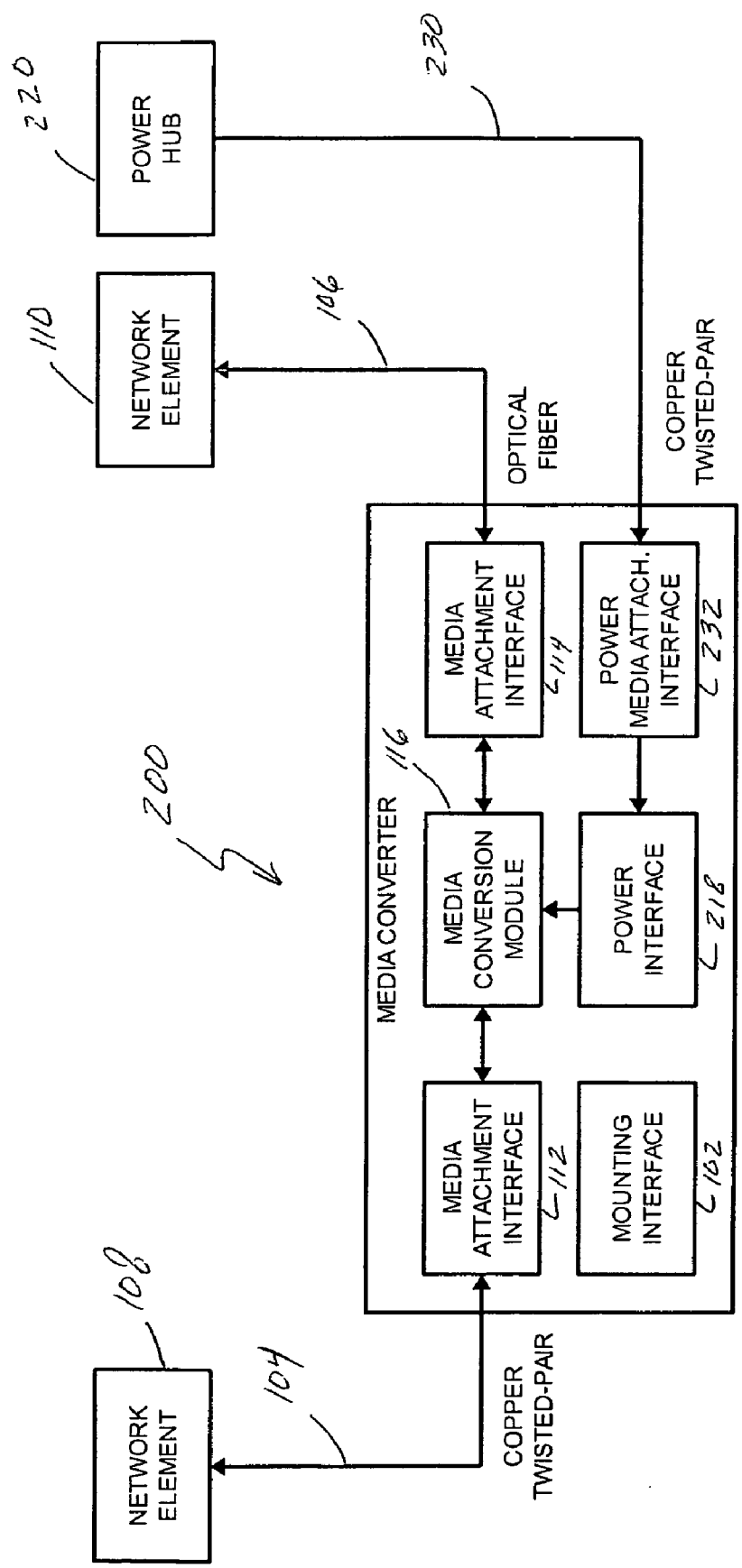
FIG. 2 is a block diagram of an embodiment of a media converter.

FIG. 2 is a block diagram of an embodiment of a media converter 200. Except as described here, the media converter 200 shown in FIG. 2 is similar to the media converter 100 shown in FIG. 1 and similar components are referenced in FIG. 2 using the same reference numerals used in FIG. 1. The media converter 200 is powered using power supplied over a physical communication medium 230 (also referred to here as the "power physical communication medium" 230) other than the physical communication media used to implement the fist or second communication links 104 or 106. In the embodiment shown in FIG. 2, the power physical communication medium 230 comprises copper twisted-pair cable (also referred to here as the "power copper twisted-pair cable") over which power is supplied to the media converter 200 using Power-over-Ethernet techniques.

In such an embodiment, a power hub 220 (located, in this embodiment, near the second network element 110) injects a DC voltage onto the power physical communication medium 230. The media converter 200 comprises a power media attachment interface 232 that is used to physically attach the power physical communication media 230 to the media converter 200. In the embodiment shown in FIG. 2, where the power communication medium 230 is implemented using copper twisted-pair cable, the power media attachment interface 232 comprises a termination tower (or other connector) that physically attaches the copper twisted-pair cable to the media converter 200. The media converter 200 further comprises a power interface 218 that picks the injected DC voltage off of the power wires and uses the picked-off voltage to power the media conversion module 116 of the media converter 200. In one implementation, the power interface 218 regulates or otherwise converts the picked-off voltage to one or more voltages suitable for use by the media conversion module 116.

Media converter 200 is suitable for use, for example, where unused copper twisted-pair cable is available (for example, where the second communication link 106 has been "upgraded" from copper twisted-pair cable to optical fiber). By using the otherwise-unused copper twisted-pair cable to provide power to the media converter 200, the media converter 200 need not be located near an external power source.

Figure 3:
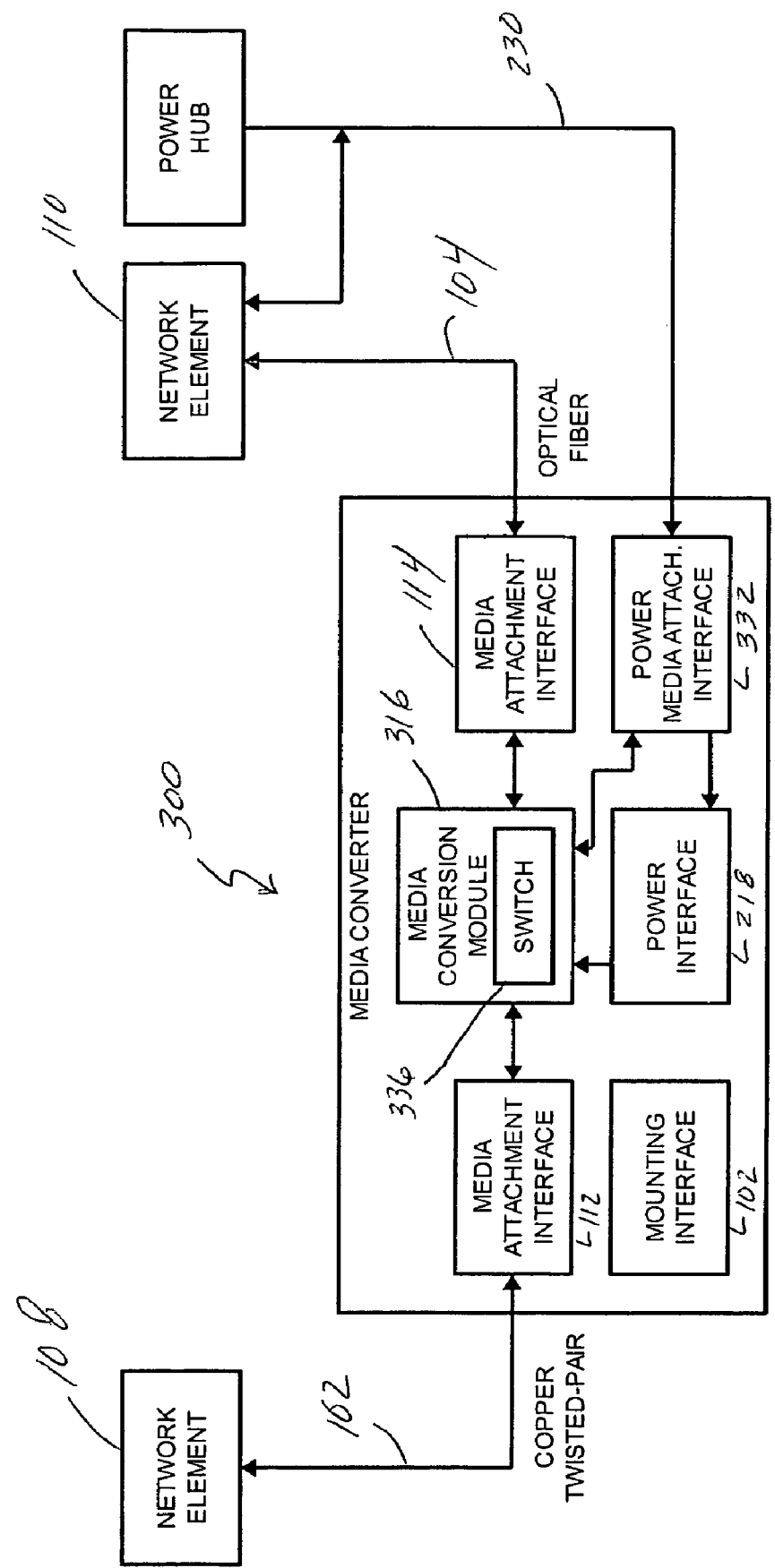
FIG. 3 is a block diagram of an embodiment of a media converter.

FIG. 3 is a block diagram of an embodiment of a media converter 300. Except as described here, the media converter 300 shown in FIG. 3 is similar to the media converter 200 shown in FIG. 2 and similar components are referenced in FIG. 3 using the same reference numerals used in FIG. 2. In the embodiment shown in FIG. 3, the media converter 300 comprises a power media attachment interface 332 that is used to physically attach the power physical communication medium 230 to the media converter 300. The power interface 218 picks the injected DC voltage off of the power wires and uses the picked-off voltage to power a media conversion module 316 included in the media converter 300. The media conversion module 316 is communicatively coupled to the first and second communication links 104 and 106 and performs the signal conversion functions as described above in connection with media conversion module 116.

In the embodiment shown in FIG. 3, the power media attachment interface 332 also communicatively couples the power physical communication medium 230 to the media conversion module 316 so that data can be sent and received on the power physical communication medium 230. In this way, data in addition to power can be sent and received over the power physical communication medium 230. For example, in one implementation, the power physical communication medium 230 is communicatively coupled to second network element 110. The power physical communication medium 230 is used as a backup data path between the second network element 110 and the media converter 300 for use in the event that the media conversion module 316 is unable to communicate with the second network element 110 over the second communication link 106. For example, in the embodiment shown in FIG. 3, the media conversion module 316 comprises a switch 336 that communicatively couples the first communication link 104 to the power physical communication medium 230 in the event that the media conversion module 316 is unable to communicate with the second network element 110 over the second communication link 106.

Figure 4:
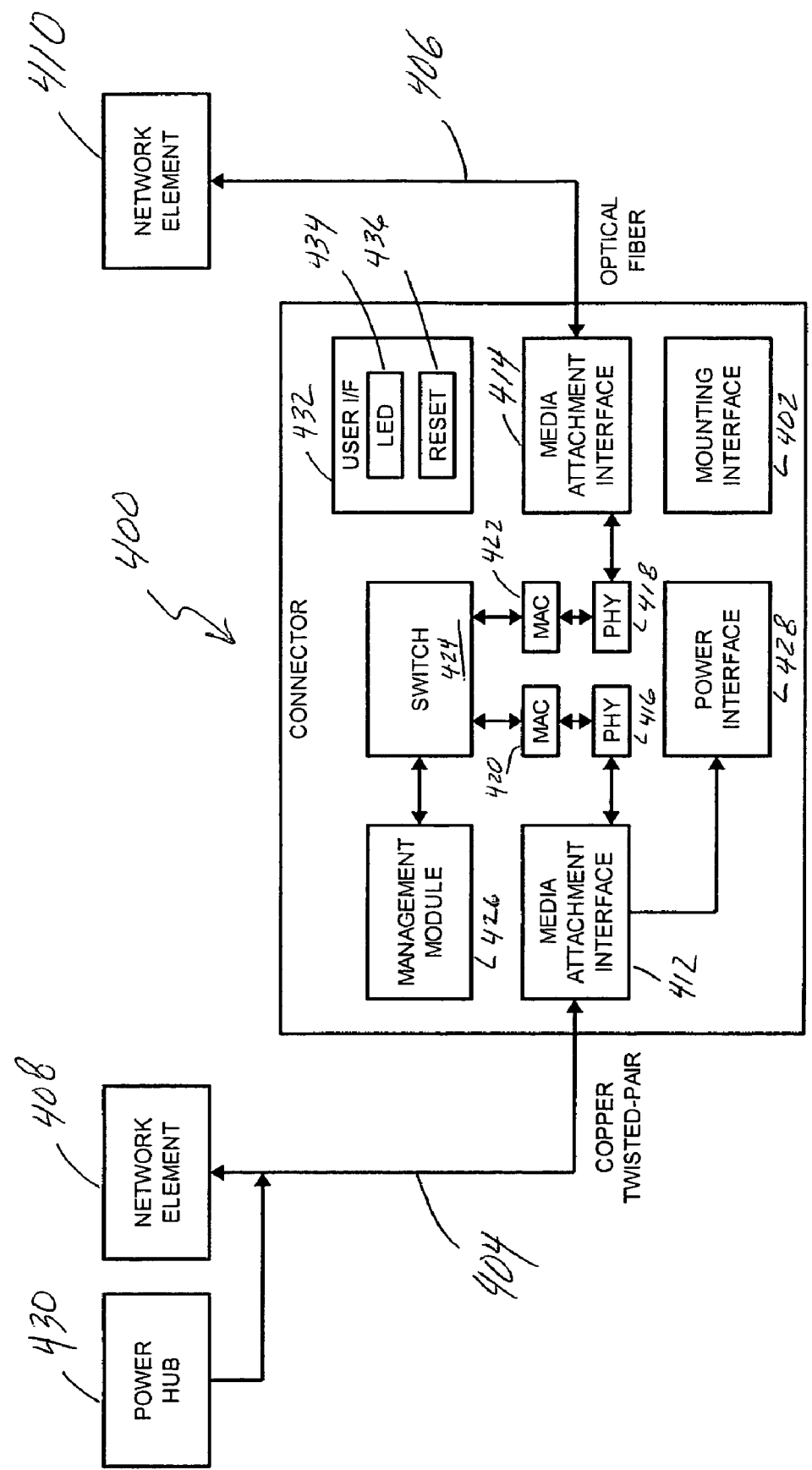
FIG. 4 is a block diagram of a wall-mountable connector.

FIG. 4 is a block diagram of a wall-mountable connector 400. In the embodiment shown in FIG. 4, the connector 400 comprises a mounting interface 402 for mounting the connector 400 to a wall or other structure. For example, in one implementation of such an embodiment, the mounting interface 402 comprises a face plate that attaches the other components of the connector 400 (or housing that contains such components) to a wall or other structure. In another implementation, the mounting interface 402 comprises a surface-mount wall box that houses the components of the connector 400 and attaches the components to a wall or other structure.

The connector 400 is used to communicatively couple a first communication link 404 to a second communication link 406. In one embodiment, the physical communication medium used to implement the first communication link 404 (also referred to here as the "first physical communication medium") differs from the physical communication medium used to implement the second communication link 406 (also referred to here as the "second physical communication medium"). For example, in the embodiment shown in FIG. 4, the first communication link 404 is implemented using copper twisted-pair cable (for example, a CAT 5 cable) and the second communication link 406 is implemented using an optical fiber (for example, a single-mode or dual-mode optical fiber). In another embodiment, the same type of physical communication medium is used to implement both the first communication link 404 and the second communication link 406. For example, in one implementation of such an embodiment, the first communication link 404 and the second communication link 406 are implemented using respective copper twisted-pair cables (for example, CAT 5 cables). In other embodiments, other physical communication media are used to implement the first communication link 404 and/or the second communication link 406.

The first communication link 404 is used to communicatively couple the connector 400 to a first network element 408 and the second communication link 406 is used to communicatively couple the connector 400 to a second network element 410. For example, in one embodiment, the first network element 408 comprises a networking device such as a hub or router and the second network element 410 comprises a computing device such as a personal computer or server computer. In other embodiments, the first network element 408 and/or the second network element 410 comprise other devices.

The connector 400 comprises first and second media attachment interfaces 412 and 414. The first media attachment interface 412 is used to physically attach the first physical communication medium to the connector 400. The second media attachment interface 414 is used to physically attach the second physical communication medium to the connector 400. In the embodiment shown in FIG. 4, where the first communication link 404 is implemented using a copper twisted-pair cable, the first media attachment interface 412 comprises a modular jack (such as modular RJ-45 jack). In such embodiment, a plug is attached at an end of the copper twisted-pair cable used to implement the first communication link 404. The copper twisted-pair cable is physically attached to the connector 400 by inserting the plug into the modular jack. Also, in the embodiment shown in FIG. 4, where the second communication link 406 is implemented using an optical fiber, the second media attachment interface 414 comprises a fiber connector (such as a SC, ST, or FC fiber connector). In such an embodiment, the optical fiber is physically attached to the connector 400 by inserting the optical fiber into the fiber connector.

The connector 400 further comprises first and second physical layer (PHY) devices 416 and 418. The first physical layer device 416 is communicatively coupled to the first media attachment interface 412 and the second physical layer device 418 is communicatively coupled to the second media attachment interface 414. The first and second physical layer devices 416 and 418 implement physical layer functionality (for example, a transmitter and receiver and coding and decoding) for the first and second communication links 404 and 406, respectively. For example, in one embodiment where the first communication link 404 is implemented using a copper twisted-pair cable and the second communication link 406 is implemented using an optical fiber, the first physical layer devices 416 comprises an auto-negotiating 10/100BASE-T physical layer device and the second physical layer device 418 comprises an auto-negotiating 10/100BASE-FL physical layer device.

The connector 400 further comprises first and second media access control (MAC) devices 420 and 422 that are communicatively coupled to the first and second physical layer devices 416 and 418, respectively. For example, in one embodiment where the first communication link 404 is implemented using a copper twisted-pair cable and the second communication link 406 is implemented using an optical fiber, the first and second MAC devices 420 and 422 implement ETHERNET media access rules specified in the IEEE 802.3 standards (for example, Carrier Sense Multiple Access With Collision Detection (CSMA/CD) algorithms). The connector 400 further comprises a switch 424 that is communicatively coupled to the first and second MAC devices 420 and 422. The switch 424 forwards packets between the first communication link 404 (via the first PHY device 416 and the first MAC device 420) and the second communication link 406 (via the first PHY device 418 and the first MAC device 422).

The connector 400 also includes support for management functionality. In the particular embodiment shown in FIG. 1, the connector 400 comprises a management module 426 that implements at least a portion of the operation, administration, and maintenance (OAM) functionality specified in the IEEE 802.3ah standard, which is incorporated herein by reference. The management module 426 establishes and manages OAM support for one or more the first and second communication links 404 or 406. For example, in one implementation of such an embodiment, the management module 426 implements the remote failure indication, remote loopback, and link monitoring functionality specified in the IEEE 802.3ah standard. In other embodiments, other management or diagnostic functionality (for example, simple network management protocol (SNMP) functionality) is supported by the management module 426 in addition to or instead of IEEE 802.3ah OAM functionality. In one implementation of such an embodiment, at least a portion of the management module 426 is implemented as an application-specific integrated circuit (ASIC) device. In another implementation, at least a portion of the management module 426 is implemented in software executed on a programmable processor (such as a microprocessor). In another implementation, at least a portion of the switch 424 and at least a part of the management module 426 are implemented in or using the same device.

The connector 400 further comprises a power interface 428. The power interface 428 provides power to the various active components of the connector 428. The connector 400 is powered using power delivered on the physical communication medium used to implement one of the first and second communication links 404 or 406. In the embodiment shown in FIG. 4, power is supplied to the connector 400 over the copper twisted-pair cable used to implement the first communication link 404 using Power over Ethernet techniques. In such an embodiment, a power hub 430 (or other power supplying device) (located near or incorporated in the first network element 408) injects a DC voltage onto one or more of the wires included in the copper twisted-pair cable used to implement the first communication link 404. The power interface 428 of the connector 400 picks the injected DC voltage off of the power wires and uses the picked-off voltage to power the active components of the connector 400. In one implementation, the power interface 428 regulates or otherwise converts the picked-off voltage to one or more voltages suitable for use by one or more of the active components of the connector 400. By using power that is supplied over the first physical communication medium, the connector 400 need not be located near an external power source.

The connector 400 further comprises a user interface 432 by which the connector 400 is able to output and/or receive information for and/or from a user. In the particular embodiment shown in FIG. 4, the user interface 432 comprises one or more light-emitting diodes (LEDs) 434 by which status information (for example, whether the connector 400 is powered on and/or whether there is any network activity on either of the first and second communication links 404 and 406) is communicated. In the embodiment shown in FIG. 1, the user interface 432 further comprises a reset button 436 that, when actuated by a user, causes the connector 400 to perform a reset operation. In some other embodiments, the user interface 432 is implemented in other ways. In some other embodiments, the connector 400 does not include a user interface 432.

When a packet is received on the first communication link 404 by the first physical layer device 416, the received packet is forwarded to the switch 424 via the first MAC device 420. The switch 424 determines if the received packet is an OAM protocol data unit (OAMPDU) as specified in the IEEE 802.3ah standard. If the received packet is not an OAMPDU, the switch 424 forwards the received packet to the second MAC device 422, which in turn transmits the packet on the second communication link 406 using the second physical layer device 418. Likewise, when a packet is received on the second communication link 406 by the second physical layer device 418, the received packet is forwarded to the switch 424 via the second MAC device 422. The switch 424 determines if the received packet is an OAMPDU. If the received packet is not an OAMPDU, the switch 424 forwards the received packet to the first MAC device 420, which in turn transmits the packet on the first communication link 404 using the first physical layer device 416. In this way, the connector 400 "connects" the first communication link 404 to the second communication link 406.

When the switch 424 determines that a received packet (received from the first or second communication link 404 or 406) is an OAMPDU, the OAMPDU is forwarded to the management module 426, which performs any OAM action specified by or otherwise associated with the received OAMPDU. For example, during an OAM discovery process, the connector 400 transmits and receives OAMPDUs on the first communication link 404 in order to enable and configure OAM functionality for the first communication link 404. After OAM functionality has been enabled and configured for the first communication link 404, the management module 426 responds to any OAMPDUs received by the connector 400 on the first communication link 404 in accordance with the OAMPDU response rules specified in the IEEE 802.3ah standard. For example, the management module 426 can be configured via appropriate OAMPDUs to enter a "loopback" mode in which the management module 426 loops back OAMPDUs received by the connector 400 on the first communication link 404. In addition or instead, the management module 426 can be configured via appropriate OAMPDUs to communicate events to a device coupled to the first communication link 404. Examples of events specified in the IEEE 802.3ah standard include a link failure event that indicates a fault has occurred in the receive direction (relative to the connector 400) on the first communication link 404, a dying gasp event that indicates that an unrecoverable failure has occurred at the connector 400, and a critical event that indicates that an unspecified critical event has occurred. In one implementation of such an embodiment, the management module 426 supports a unidirectional OAM mode in which the management module 426 transmits informational OAMPDUs (indicating a link failure) on the first communication link 404 when a link failure has occurred.

The OAM functionality supported by the connector 400 can be used to localize faults and to test the performance of the first and the second communication link 404 and 406. By including OAM functionality in a wall-mounted connector 400, additional resolution is added to such fault localization and performance testing processing.

Figure 5:
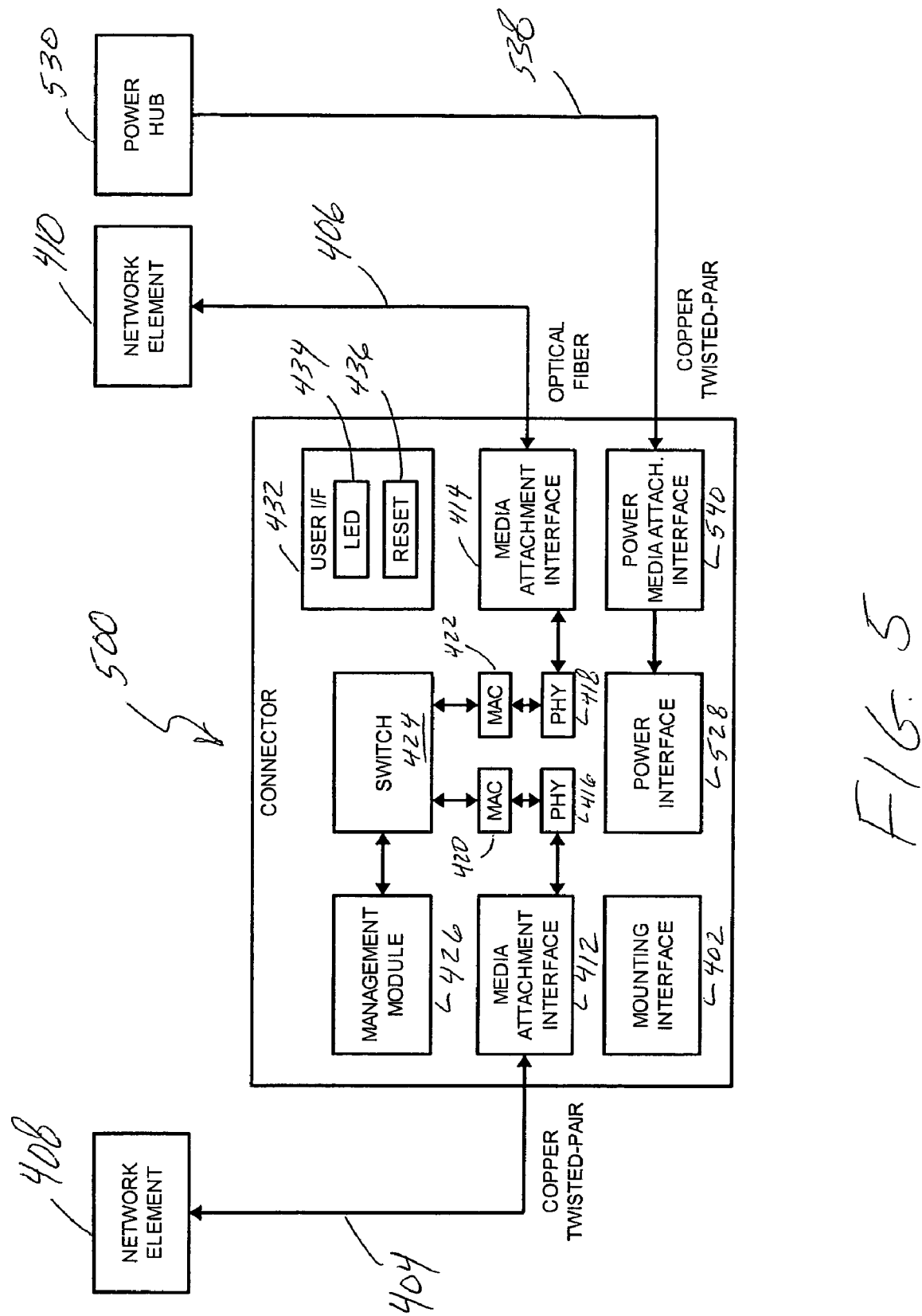
FIG. 5 is a block diagram of an embodiment of a wall-mountable connector.

FIG. 5 is a block diagram of an embodiment of a wall-mountable connector 500. Except as described here, the connector 500 shown in FIG. 5 is similar to the connector 400 shown in FIG. 4 and similar components are referenced in FIG. 5 using the same reference numerals used in FIG. 4. The connector 500 is powered using power supplied over a physical communication medium (also referred to here as the "power physical communication medium" 538) other than the physical communication medium used to implement the fist or second communication links 404 or 406. In the embodiment shown in FIG. 5, the power physical communication media 538 comprises a copper twisted-pair cable (also referred to here as the "power copper twisted-pair cable") over which power is supplied to the connector 500 using Power-over-Ethernet techniques.

In such an embodiment, a power hub 530 (located, in this embodiment, near the second network element 410) injects a DC voltage onto the power physical communication medium 538. The connector 500 comprises a power media attachment interface 540 that is used to physically attach the power physical communication medium 538 to the connector 500. In the embodiment shown in FIG. 5, where the power communication medium 538 is implemented using copper twisted-pair cable, the power media attachment interface 540 comprises a termination tower (or other connector) that is used to physically attach the power physical communication medium 538 to the connector 500. The connector 500 further comprises a power interface 528 that picks the injected DC voltage off of the power wires and uses the picked-off voltage to power the active components of the connector 500. In one implementation, the power interface 528 regulates or otherwise converts the picked-off voltage to one or more voltages suitable for use by the connector 500.

The connector 500 is suitable for use, for example, where unused copper twisted-pair cable is available (for example, where the second communication link 406 between the second network element 410 and the connector 500 has been "upgraded" from copper twisted-pair cable to optical fiber). By using the otherwise-unused copper twisted-pair cable to provide power to the connector 500, the connector 500 need not be located near an external power source.

Figure 6:
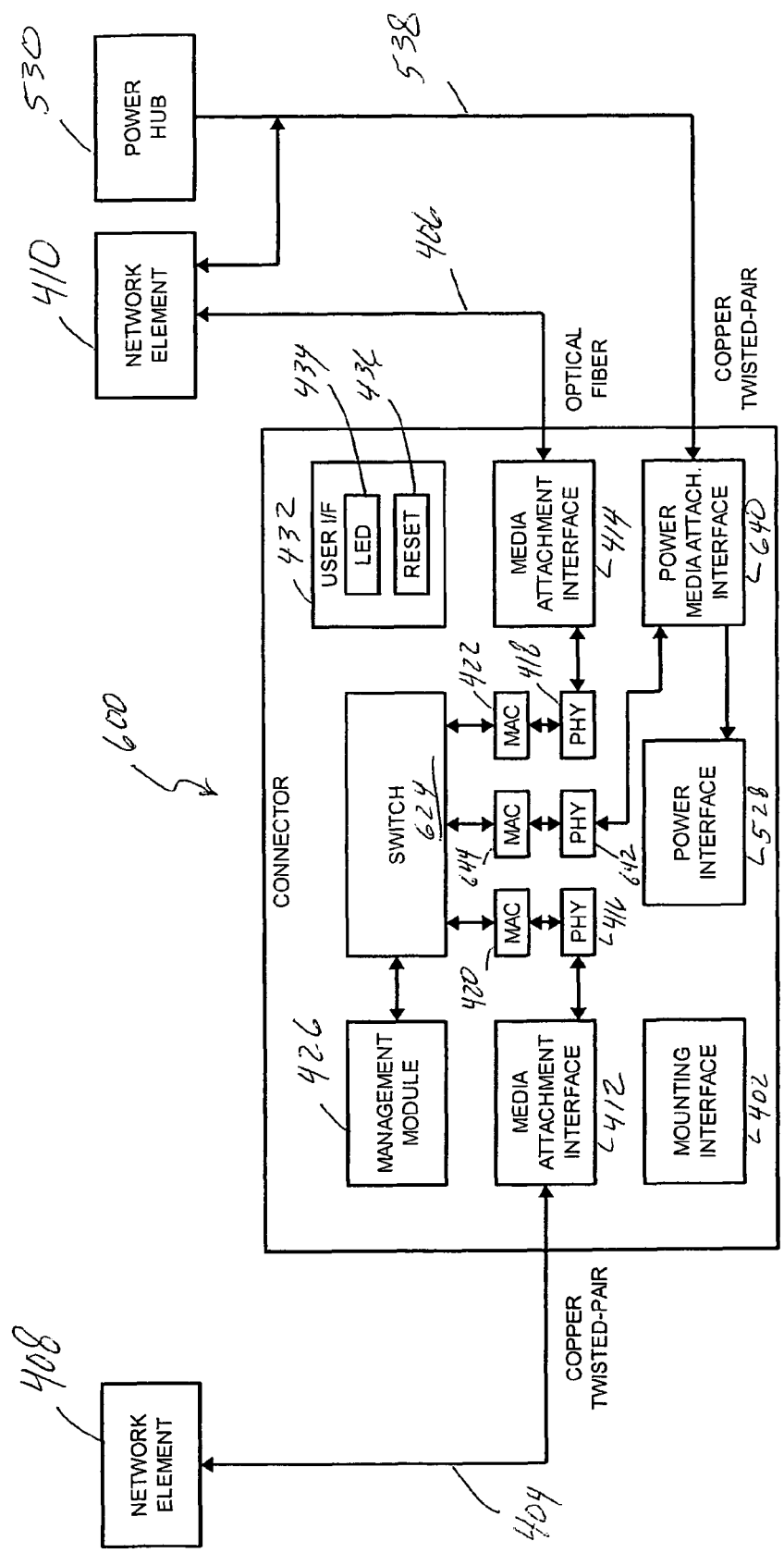
FIG. 6 is a block diagram of an embodiment of a wall-mountable connector.

FIG. 6 is a block diagram of an embodiment of a wall-mountable connector 600. Except as described here, the connector 600 shown in FIG. 6 is similar to the connector 500 shown in FIG. 5 and similar components are referenced in FIG. 6 using the same reference numerals used in FIG. 5. In the embodiment shown in FIG. 6, the connector 600 comprises a power media attachment interface 640 that is used to physically attach the power physical communication medium 538 to the connector 600. The power interface 528 picks the injected DC voltage off of the power wires and uses the picked-off voltage to power the active components of the connector 600. The connector 600 further comprises a switch 624 that is communicatively coupled to the first communication link 404 (via the first PHY device 416 and the first MAC device 420) and to the second communication link 406 (via the first PHY device 418 and the first MAC device 422). The switch 624 forwards packets among the first and second communication links 404 and 406 and the management module 426.

In the embodiment shown in FIG. 6, the power media attachment interface 640 also communicatively couples the power physical communication medium 538 to the switch 624 so that data can be sent and received on the power physical communication medium 538. In this way, data in addition to power can be sent and received over the power physical communication medium 538. For example, in one implementation, the power physical communication medium 538 is communicatively coupled to a second network element 610. The power physical communication medium 538 is used as a backup data path between the second network element 610 and the connector 600 for use in the event that the switch 624 is unable to communicate with the second network element 610 over the second communication link 406.

In the embodiment shown in FIG. 6, the switch 624 is communicatively coupled to the power media attachment interface 640 via a power physical layer device 642 and a power media access control device 644.

Figure 7:
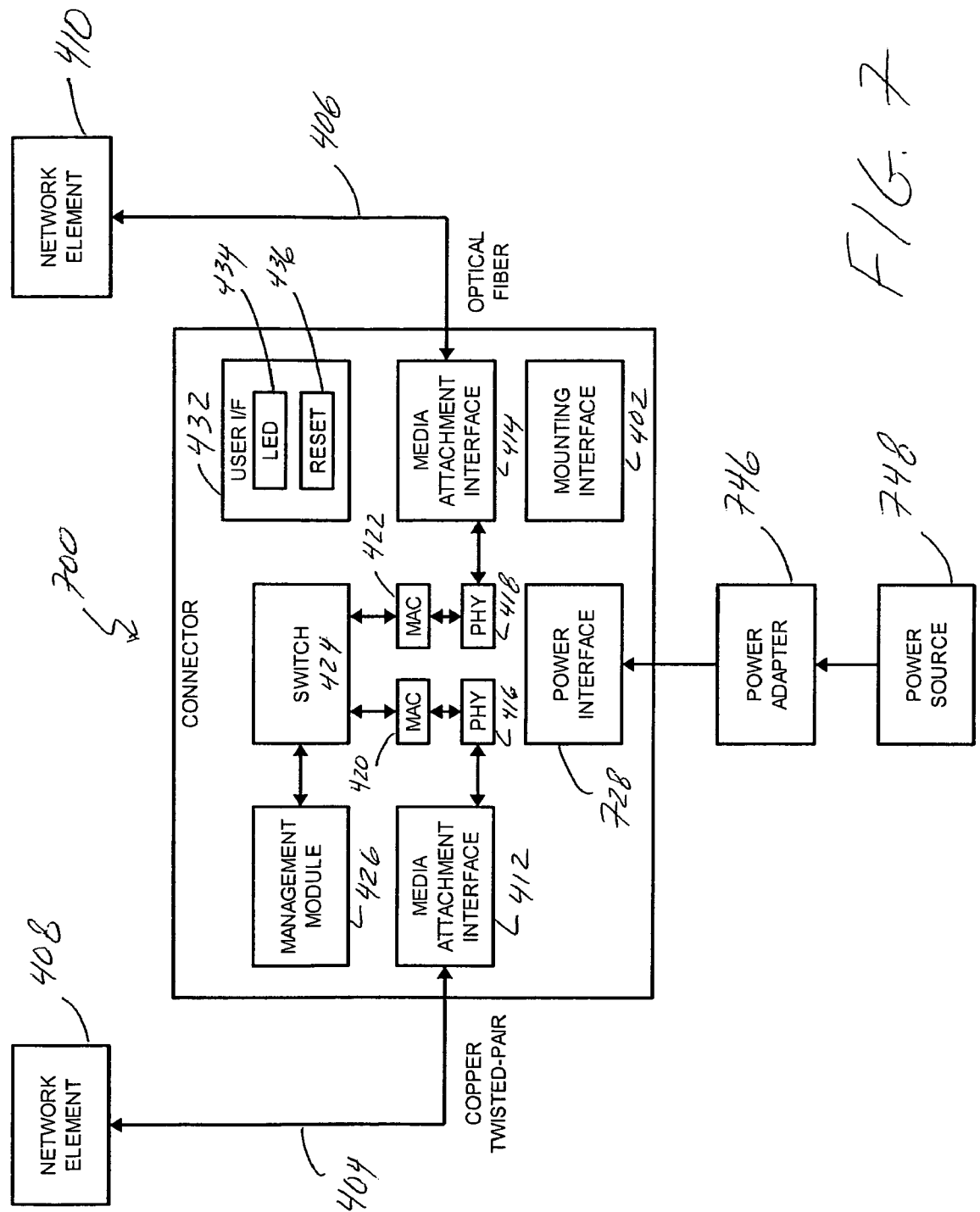
FIG. 7 is a block diagram of an embodiment of a wall-mountable connector.

FIG. 7 is a block diagram of an embodiment of a wall-mountable connector 700. Except as described here, the connector 700 shown in FIG. 7 is similar to the connector 400 shown in FIG. 4 and similar components are referenced in FIG. 7 using the same reference numerals used in FIG. 4. The connector 700 is powered using power supplied by a power adapter 746 that is external to the connector 700. The external power adapter 746 is coupled to an alternating current (AC) power source 748 (for example, an AC outlet). The power adapter 746 converts AC power received from the AC power source 748 to direct current power suitable for powering the active components of the connector 700, which is supplied to a power interface 728 of the connector 700.

Figure 8:
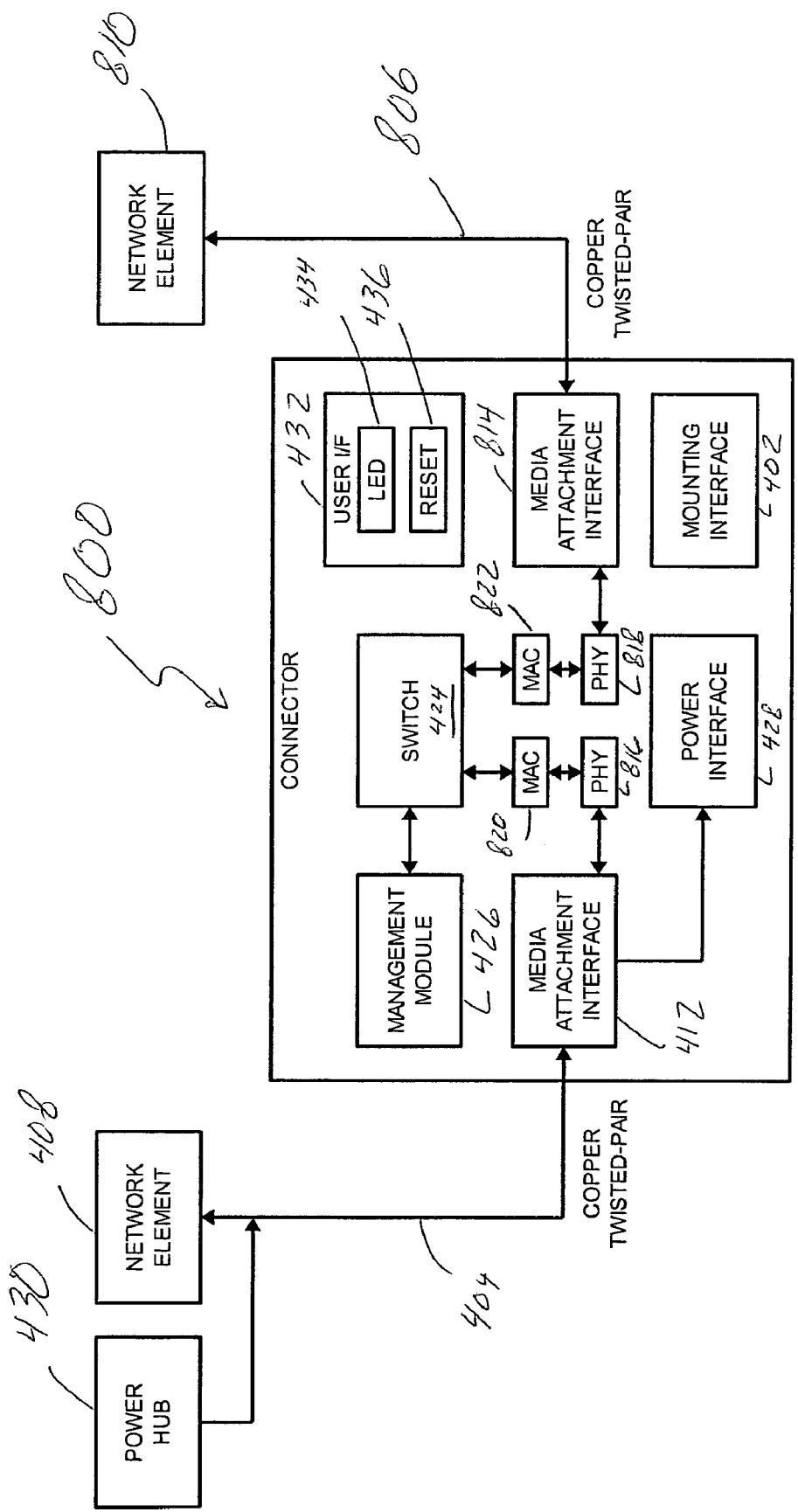
FIG. 8 is a block diagram of an embodiment of a wall-mountable connector.

FIG. 8 is a block diagram of an embodiment of a wall-mountable connector 800. Except as described here, the connector 800 shown in FIG. 8 is similar to the connector 400 shown in FIG. 4 and similar components are referenced in FIG. 8 using the same reference numerals used in FIG. 4. The connector 800 is used to communicatively couple a first communication link 404 to a second communication link 806 that are both implemented using some type of copper twisted-pair cabling. In such an embodiment, a first media attachment interface 412 is used to physically attach, to the connector 800, the copper twisted-pair cabling used to implement the first communication link 404. A second media attachment interface 814 is used to physically attach, to the connector 800, the copper twisted-pair cabling used to implement the second communication link 806. In such an embodiment, both the first and second media attachment interfaces 414 and 816 comprise, respectively, first and second modular jacks (such as modular RJ-45 jacks). The connector 800 also comprises first and second physical layer devices 816 and 818, each of which is implemented using a respective auto-negotiating 10/100/1000BASE-T physical layer device. Power is supplied to the connector 800 (and the components thereof) on the physical communication medium used to implement the first communication link 404.

In one usage scenario, the first network element 408 is only capable of supporting up to 100 Mbps ETHERNET traffic while the second network element 810 supports up to 1000 Mbps ETHERNET traffic. In such a scenario, the first network element 408 is coupled to the connector 800 using, for example, a CAT 5 cable and the second network element 810 is coupled to the connector 800 using, for example, a CAT 5e or CAT 6 cable. In such a usage scenario, the switch 424 forwards data between the first MAC device 820 (and first physical layer device 816), the second MAC device 822 (and second physical layer device 818), and the management modulate 426. In such a scenario, the connector 800 serves as a "speed" converter that converts the 100BASE-T traffic received from the first communication link 404 into 1000BASE-T traffic for transmission on the second communication link 806 and that converts the 1000BASE-T traffic received from the second communication link 806 into 100BASE-T traffic for transmission on the first communication link 404. In other usage scenarios, the first communication link 404 and the second communication link 806 communicate data at other speeds (for example, at the same speed or at different speeds where the connector 800 acts as a speed converter).

Figure 9:
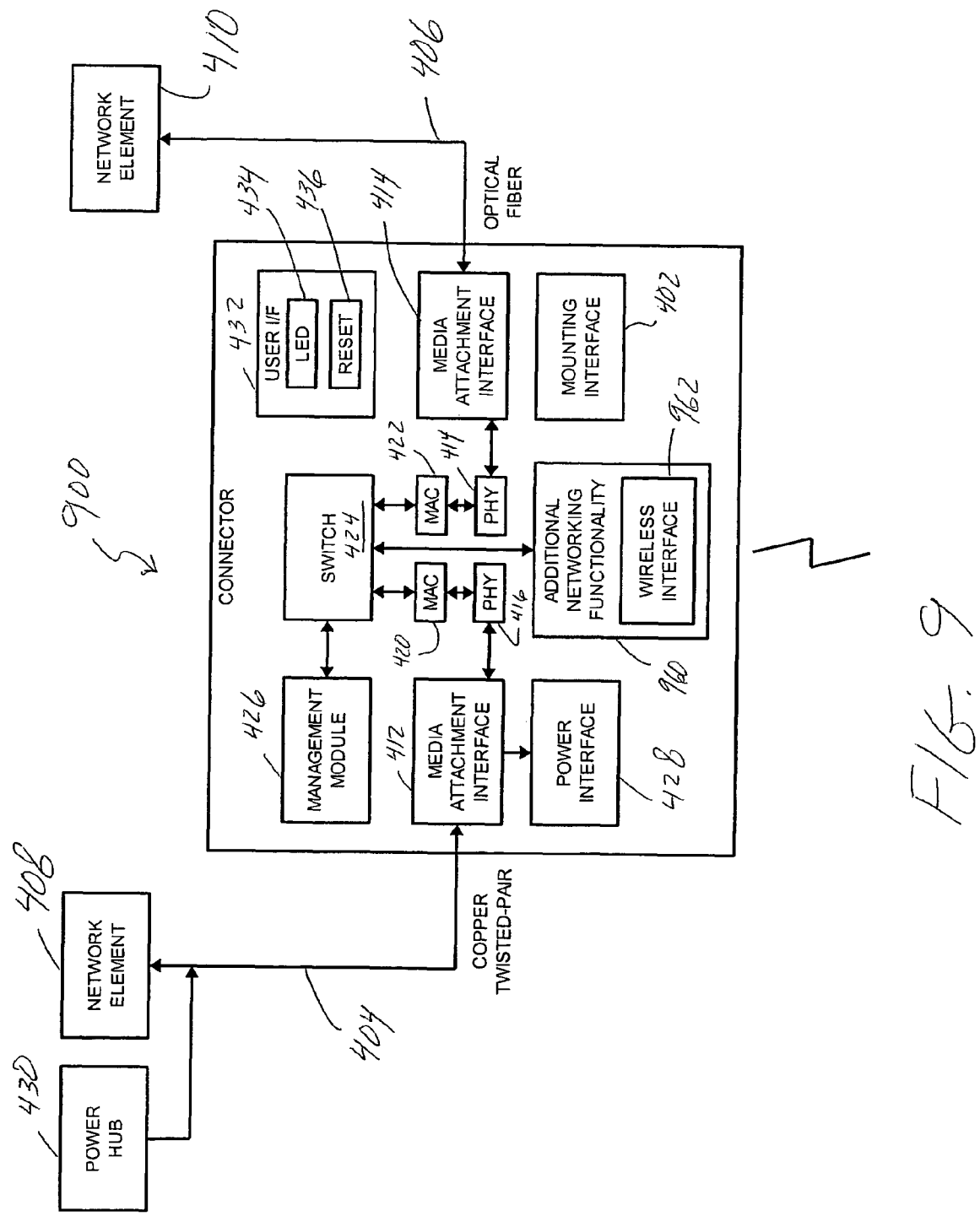
FIG. 9 is a block diagram of an embodiment of a wall-mountable connector.

FIG. 9 is a block diagram of an embodiment of a wall-mountable connector 900. Except as described here, the connector 900 shown in FIG. 9 is similar to the connector 400 shown in FIG. 4 and similar components are referenced in FIG. 9 using the same reference numerals used in FIG. 4. The connector 900 further comprises additional networking functionality 960 that is communicatively coupled to the switch 424 and (via the switch 424) to the first communication link 404 (and the first network element 408 coupled thereto) and the second communication link 406 (and the second network element 410 coupled thereto). In the embodiment shown in FIG. 9, the additional networking functionality 960 comprises a wireless interface 962 that is communicatively coupled to the switch 424. The wireless interface 962 includes appropriate functionality for communicating with one or more wireless devices over one or more wireless communication links (for example, radio frequency and/or infrared wireless links). In one implementation, the wireless interface 962 supports at least one of standards included in the family of IEEE 802.11 or IEEE 802.16 standards or the BLUETOOTH standard. In one application, a plurality of such connectors 900 are located throughout a facility that otherwise makes use of wall-mounted connectors to provide wired connectivity (for example, in an office environment). The plurality of connectors 900 are used in such an application to also implement, for example, an Extend Service Set (ESS) to provide wireless coverage throughout such a facility (for example, for mobile computing, telephony, and/or entertainment devices such as portable computers, personal digital assistants, voice-over-internet-protocol (VoIP) phones, audio/video players, and/or combinations thereof).

In the embodiment shown in FIG. 9, the additional networking functionality 960 is powered by the power extracted by the power interface 428 from the first communication link 404. In other embodiments, the additional networking functionality is powered in other ways (for example, by receiving power from an external power adapter that is coupled to the connector 900). Moreover, in such an embodiment, the additional networking functionality 960 (for example, the wireless interface 962) included in the connector 900 can be managed remotely using the management module 426.

In other embodiments, the additional networking functionality 960 comprises other functionality, in addition to or instead of, the wireless interface 962 (for example, one or more of a router, a DHCP/NAT server, a firewall, and/or a BLUETOOTH hub).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A connector comprising:
    a first media attachment interface to physically attach a first communication medium to the connector;
    a second media attachment interface to physically attach a second communication medium to the connector; and
    a mounting interface to physically attach the connector to a structure;
    wherein the connector communicatively couples the first communication medium to the second communication medium; and
    wherein the connector further comprises a power media attachment interface to physically attach a third communication medium to the connector, wherein power is injected onto the third communication medium and wherein the third communication medium is different from the first communication medium and the second communication medium; and
    wherein the connector further comprises a power interface, coupled to the power media attachment interface, that extracts power from the third communication medium and supplies power to the connector;
    wherein the connector is configured so that the mounting interface, the power media attachment interface, the first media attachment interface, and the second media attachment interface are directly attached to the structure to which the connector is physically attached.

2. The connector of claim 1, wherein the structure comprises a wall.

3. The connector of claim 2, wherein the additional networking functionality comprises a wireless interface.

4. The connector of claim 1, wherein the mounting interface comprises at least one of a face plate and a surface-mount wall box.

5. The connector of claim 1, wherein the connector processes management data communicated over at least one of the first communication medium and the second communication medium.

6. The connector of claim 1, further comprising additional networking functionality.

7. The connector of claim 1, further comprising an ETHERNET switch that forwards data between the first communication medium and the second communication medium.

8. The connector of claim 7, further comprising:
    a first physical layer device communicatively coupled to the first media attachment interface;
    a first media access control device communicatively coupled to the first physical layer device and the ETHERNET switch;
    a second physical layer device communicatively coupled to the second media attachment interface; and
    a second media access control device communicatively coupled to the second physical layer device and the ETHERNET switch.

9. The connector of claim 1, wherein each of the first communication medium and the second communication medium comprises at least one of copper wiring and optical fiber.

10. The connector of claim 1, further comprising a management module that processes management data.

11. The connector of claim 1, wherein the connector processes operation, administration, and maintenance protocol data units.

12. The connector of claim 1, wherein the power interface extracts power off of the third communication medium using Power over ETHERNET.

13. The connector of claim 1, further comprising a user interface by which information is at least one of received from a user and output for a user.

14. The connector of claim 13, wherein the user interface comprises at least one of a light-emitting diode and a rest button.

15. The connector of claim 1, wherein the connector is configured so that the power media attachment interface, the first media attachment interface, and the second media attachment interface are directly attached to the structure to which the connector is physically attached using the mounting interface.

16. The connector of claim 1, wherein the mounting interface comprises a faceplate that directly attaches the power media attachment interface, the first media attachment interface, and the second media attachment interface to the structure to which the connector is physically attached.

17. A connector comprising:
a mounting interface to physically attach the connector to a structure;
a first media attachment interface to physically attach a first communication medium to the connector; and
a first physical layer device communicatively coupled to the first media attachment interface;
a first media access control device communicatively coupled to the first physical layer device;
a second media attachment interface to physically attach a second communication medium to the connector;
a second physical layer device communicatively coupled to the second media attachment interface;
a second media access control device communicatively coupled to the second physical layer device;
an ETHERNET switch, communicatively coupled to the first media access control device and the second media access control device, wherein the ETHERNET switch forwards data between the first communication medium and the second communication medium; and
a power media attachment interface to physically attach a third communication medium to the connector, wherein power is injected onto the third communication medium and wherein the third communication medium is different from the first communication medium and the second communication medium; and
a power interface, coupled to the power media attachment interface, that extracts power from the third communication medium to power the connector;
wherein the connector is configured so that the mounting interface, the power media attachment interface, the first media attachment interface, and the second media attachment interface are directly attached to the structure to which the connector is physically attached.

18. The connector of claim 17, wherein the ETHERNET switch is communicatively coupled to the power media attachment interface, wherein the ETHERNET switch communicates data over the third communication medium.

19. The connector of claim 17, wherein each of the first communication medium and the second communication medium comprises at least one of copper wiring and optical fiber.

20. The connector of claim 17, wherein the connector is configured so that the power media attachment interface, the first media attachment interface, and the second media attachment interface are directly attached to the structure to which the connector is physically attached using the mounting interface.

21. The connector of claim 17, wherein the mounting interface comprises a faceplate that directly attaches the power media attachment interface, the first media attachment interface, and the second media attachment interface to the structure to which the connector is physically attached.

22. A connector comprising:
a mounting interface to physically attach the connector to a structure;
a first media attachment interface to physically attach a first communication medium to the connector; and
a first physical layer device communicatively coupled to the first media attachment interface;
a first media access control device communicatively coupled to the first physical layer device;
a second media attachment interface to physically attach a second communication medium to the connector;
a second physical layer device communicatively coupled to the second media attachment interface;
a second media access control device communicatively coupled to the second physical layer device;
an ETHERNET switch, communicatively coupled to the first media access control device and the second media access control device, wherein the ETHERNET switch forwards data between the first communication medium and the second communication medium;
a management module that processes management data communicated over at least one of the first communication medium and the second communication medium;
a power media attachment interface to physically attach a third communication medium to the connector, wherein power is injected onto the third communication medium and wherein the third communication medium is different from the first communication medium and the second communication medium; and
a power interface, coupled to the power media attachment interface, that extracts power from the third communication medium and supplies power to the connector;
wherein the connector is configured so that the mounting interface, the power media attachment interface, the first media attachment interface, and the second media attachment interface are directly attached to the structure to which the connector is physically attached.

23. The connector of claim 22, wherein the connector is configured so that the power media attachment interface, the first media attachment interface, and the second media attachment interface are directly attached to the structure to which the connector is physically attached using the mounting interface.

24. The connector of claim 22, wherein the mounting interface comprises a faceplate that directly attaches the power media attachment interface, the first media attachment interface, and the second media attachment interface to the structure to which the connector is physically attached.

25. A connector comprising:
means for physically attaching a first communication medium to the connector;
means for physically attaching a second communication medium to the connector;
and means for physically attaching the connector to a structure;
wherein the connector communicatively couples the first communication medium to the second communication medium; and
wherein the connector further comprises a power interface that extracts from a third communication medium in order to power the connector, wherein the third communication medium is different from the first communication medium and the second communication medium;

wherein the connector is configured so that the means for physically attaching the connector to the structure, the power interface, the means for physically attaching the first communication medium to the connector, and the means for physically attaching the second communication medium to the connector are directly attached to the structure to which the connector is physically attached.

26. The connector of claim 25, further comprising means for processing management data communicated over at least one of the first communication medium and the second communication medium.

27. The connector of claim 25, further comprising means for wireless interfacing a wireless device to the connector.

28. The connector of claim 25, wherein the connector is configured so that the power interface, the means for physically attaching the first communication medium to the connector, and the means for physically attaching the second communication medium to the connector are directly attached to the structure to which the connector is physically attached using the means for physically attaching the connector to the structure.

29. The connector of claim 25, wherein the means for physically attaching the connector to the structure comprises a faceplate that directly attaches the power interface, the means for physically attaching the first communication medium to the connector, and the means for physically attaching the second communication medium to the connector to the structure to which the connector is physically attached.

* * * * *